(12) United States Patent
Lee et al.

(10) Patent No.: US 7,556,689 B2
(45) Date of Patent: Jul. 7, 2009

(54) DEVICE FOR SPREADING VISCOUS THERMAL MEDIUM ON HEAT DISSIPATION DEVICE FOR ELECTRONIC COMPONENT

(75) Inventors: Chih-Peng Lee, Guangdong (CN); Tay-Jian Liu, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 455 days.

(21) Appl. No.: 11/307,544

(22) Filed: Feb. 13, 2006

(65) Prior Publication Data

US 2006/0260541 A1 Nov. 23, 2006

(30) Foreign Application Priority Data

May 20, 2005 (CN) .................... 2005 1 0034758

(51) Int. Cl.
*B05B 1/16* (2006.01)
*B23K 3/06* (2006.01)

(52) U.S. Cl. .............. 118/255; 118/302; 118/300; 228/261; 222/386; 222/385; 222/387; 222/389; 222/401; 222/402; 239/261

(58) Field of Classification Search ............. 222/386, 222/385, 387, 389, 401, 402; 118/302, 300, 118/255; 239/547; 228/261
See application file for complete search history.

(56) References Cited

U.S. PATENT DOCUMENTS

| | | | | |
|---|---|---|---|---|
| 2,392,085 | A * | 1/1946 | Ferrel | 239/533.13 |
| 6,568,925 | B2 * | 5/2003 | Gunderson | 417/545 |
| 7,332,036 | B2 * | 2/2008 | Vardelle et al. | 118/664 |
| 2004/0037955 | A1 * | 2/2004 | Pendleton et al. | 427/230 |

* cited by examiner

*Primary Examiner*—Kiley Stoner
*Assistant Examiner*—Erin B Saad
(74) *Attorney, Agent, or Firm*—Winston Hsu (57) ABSTRACT

A spreading device (10) includes an injector (14) and a spreading tube (16) connected with the injector. The injector contains therein a viscous thermal medium material for being spread on a surface of a cooling device for electronic components. The spreading tube defines therein at least one outlet hole (164) for release of the thermal medium material contained in the injector. The spreading device further includes means formed on the spreading tube for evenly distributing the material released through the outlet hole of the spreading tube over an entire area of the surface to be applied with the thermal medium material.

1 Claim, 10 Drawing Sheets

DEVICE FOR SPREADING VISCOUS THERMAL MEDIUM ON HEAT DISSIPATION DEVICE FOR ELECTRONIC COMPONENT

FIELD OF THE INVENTION

The present invention relates generally to a spreading device, and more particularly to a spreading device applicable for applying a layer of viscous thermal medium material to a surface of a heat sink for dissipating heat from a heat-generating electronic component.

DESCRIPTION OF RELATED ART

It is well known that in electronic field heat is generated by a variety of electronic components such as central processing units (CPUs) of computers during their normal operations. The workability and stability of these electronic components depend mainly on the heat removal capacity of the cooling device applied to remove the heat away from these electronic components. Generally, the cooling device includes a plurality of metal fins. In order to timely and effectively remove the heat from these electronic components, heat pipes are often combined to the metal fins of the cooling device.

Figure 9:
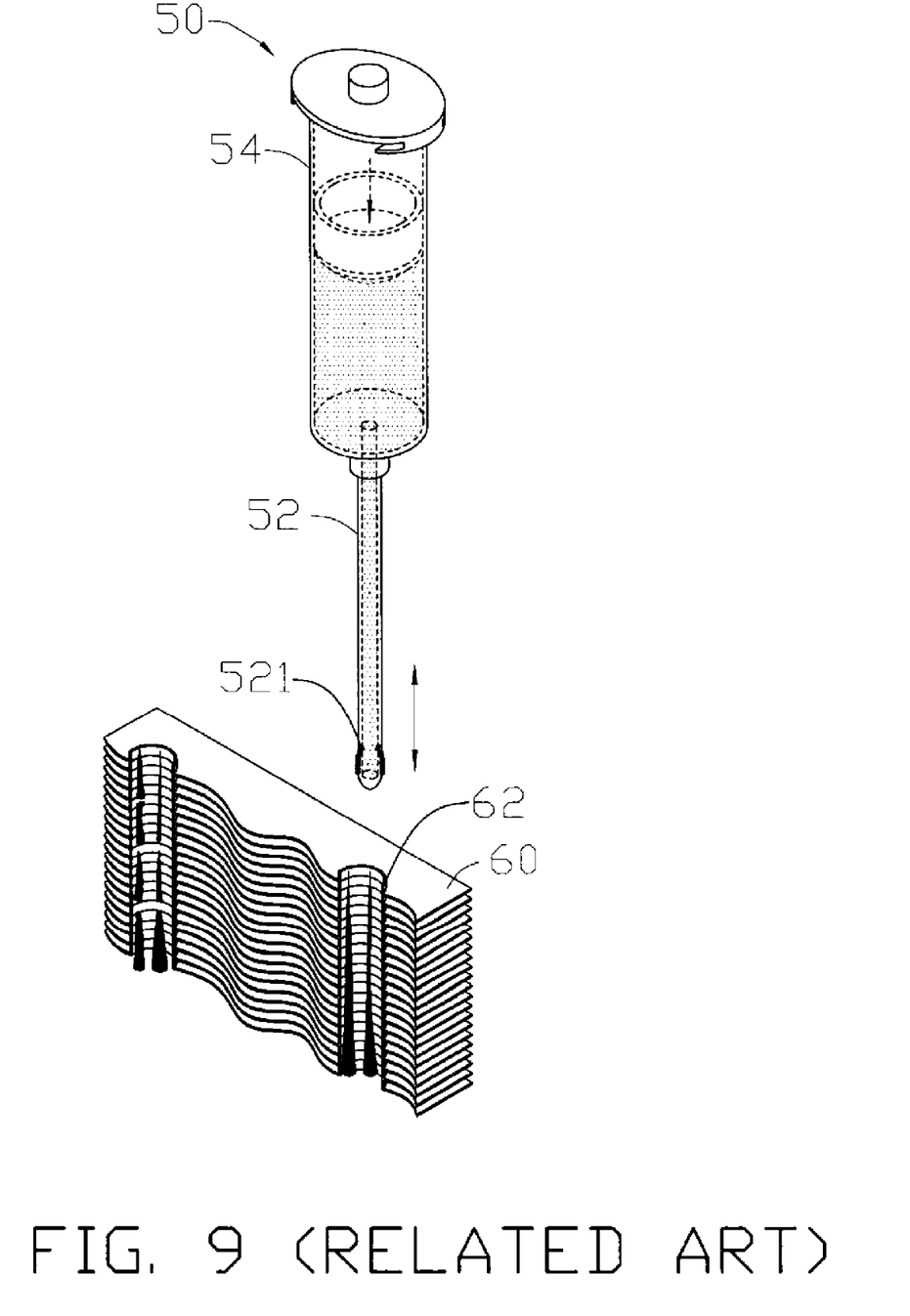
FIG. 9 is an isometric view of a spreading device in accordance with the conventional art used for spreading a solder paste to metal fins.

Currently, a method of combining the heat pipes to the metal fins involves the use of solder paste. In performing the method, a spreading device is generally required. FIG. 9 illustrates such a method, which relates to the use of a spreading device 50. The metal fins 60 are stacked with each other with a pair of elongated channels (not labeled) formed for receiving two heat pipes (not shown) therein, respectively. The metal fins 60 are shown with a portion thereof being cut away for clarity. In operation, a spreading tube 52 of the spreading device 50 is drawn through the channels of the metal fins 60 to apply a layer of solder paste in a viscous state to the inner wall surfaces of the channels which are formed by a plurality of annular flanges 62 extending from the metal fins 60. The spreading tube 52 defines therein a plurality of outlet holes 521 for release of the solder paste contained in a container 54 of the spreading device 50. After the solder paste is spread on the inner wall surfaces of the channels, the heat pipes are inserted into the channels. Finally, the heat pipes together with the metal fins 60 are heated whereby the solder paste can flow to fill gaps between the metal fins 60 and the heat pipes. After the solder paste is cooled and solidifies, the heat pipes and the metal fins 60 are mechanically and thermally combined together.

In the above-mentioned method, as the spreading tube 52 moves relative to the metal fins 60 to spread the solder paste onto the inner wall surfaces of the channels, the solder paste is released through the outlet holes 521 arranged discretely in the spreading tube 52. The solder paste is spread on the inner wall surfaces along the channels in a pattern of discrete lines. As a result, the solder paste is not evenly applied to an entire area of the inner wall surfaces of the channels. In addition, since the solder paste spread on the inner wall surfaces of the channels is not brought into close contact therewith, after spread, a portion of the solder paste will flow downwardly and finally drop off from the inner wall surfaces, subject to the gravity acting on the solder paste. The solder droplets adversely affect aesthetical appearance of the cooling device.

Figure 10:
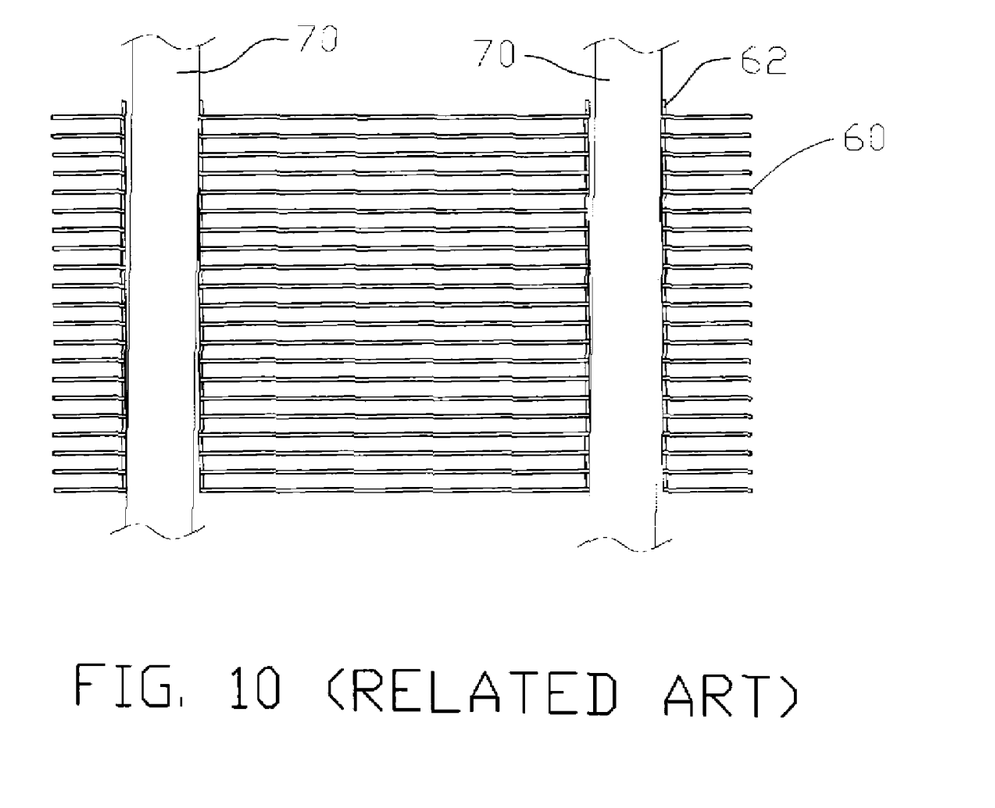
FIG. 10 is a side elevation view showing an assembly of a plurality of metal fins and a pipe assembled together by a conventional method.

To combine a metal pipe and metal fins, another technique is widely used in automobile industry for manufacturing of radiators of automobiles. As illustrated in FIG. 10, this technique relates to firstly extending a hollow pipe casing 70 of a pipe through channels defines in fins 60, and then expanding the hollow pipe casing 70 of the pipe to cause the pipe to physically engage inner wall surfaces 62 of the channels of the metal fins 60. To expand the pipe, a mandrel is typically used, which is pulled through the hollow pipe casing 70, or a hydraulic pressure generated by a pneumatic cylinder is applied to the hollow pipe casing 70, whereby the hollow pipe casing 70 is expanded to such an extent that the pipe is brought into physically contact with the inner wall surfaces 62 of the channels of the metal fins 60. However, by using this technique, air gaps inevitably exist between the pipe being expanded and the inner wall surfaces 62 of the channels. The air gaps produce a large thermal resistance between the metal fins 60 and the pipe.

Therefore, it is desirable to provide a spreading device which overcomes the foregoing disadvantages.

SUMMARY OF INVENTION

The present invention relates to a spreading device for spreading solder paste in viscous state to an inner wall surface of a channel defined in fins of a cooling device for an electronic component. The spreading device includes an injector and a spreading tube connected with the injector. The injector contains therein the viscous solder paste for being spread on the inner wall surface. The spreading tube defines therein at least one outlet hole for release of the viscous solder paste contained in the injector. The spreading device further includes means formed on the spreading tube for evenly distributing the solder paste released through the outlet hole of the spreading tube over an entire area of the inner wall surface of the channel defined in the fins.

Other advantages and novel features of the present invention will become more apparent from the following detailed description of preferred embodiment when taken in conjunction with the accompanying drawings, in which:

DEDAILED DESCRIPTION

Figure 1:
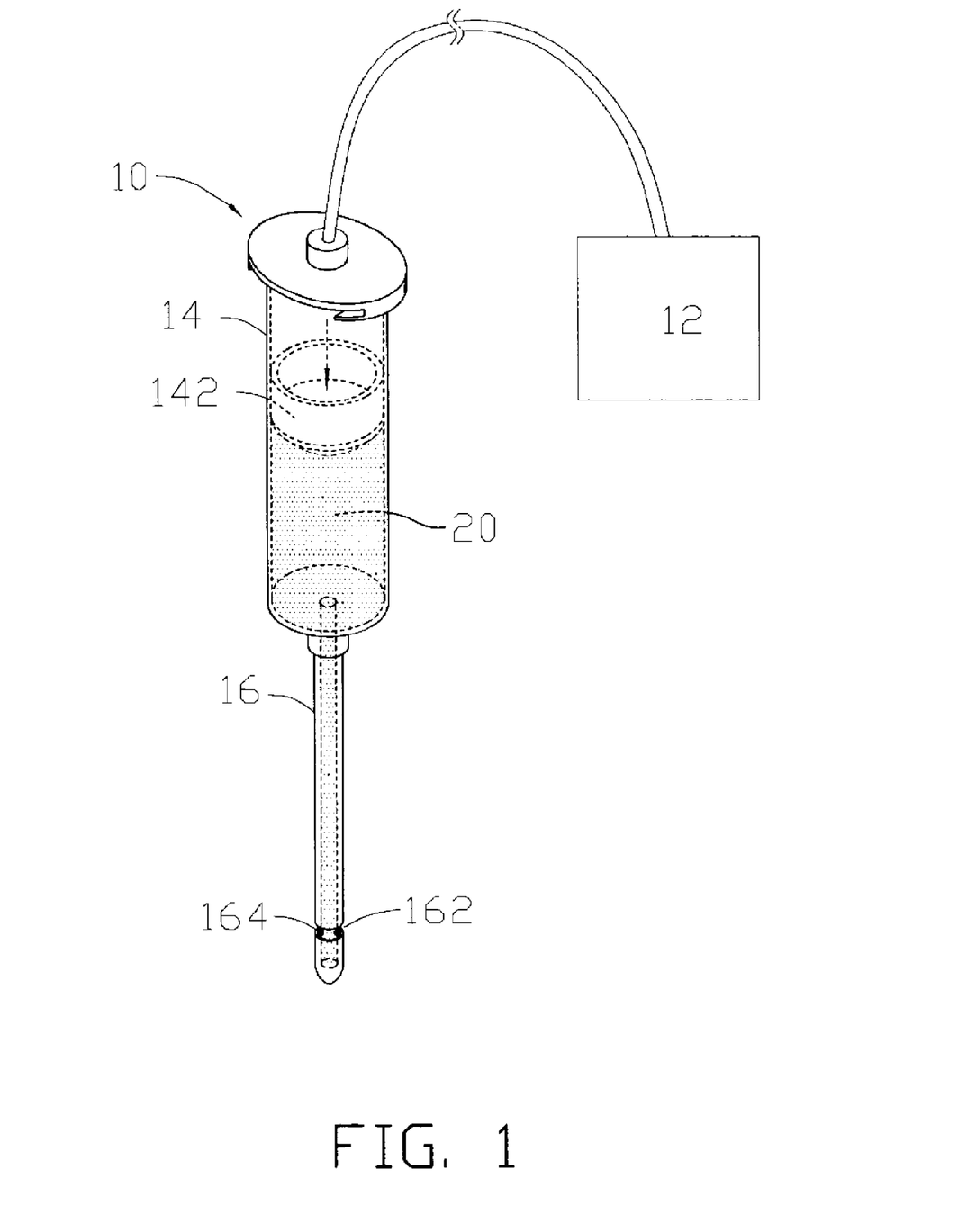
FIG. 1 is an isometric view of a spreading device in accordance with a first embodiment of the present invention.
Figure 2:
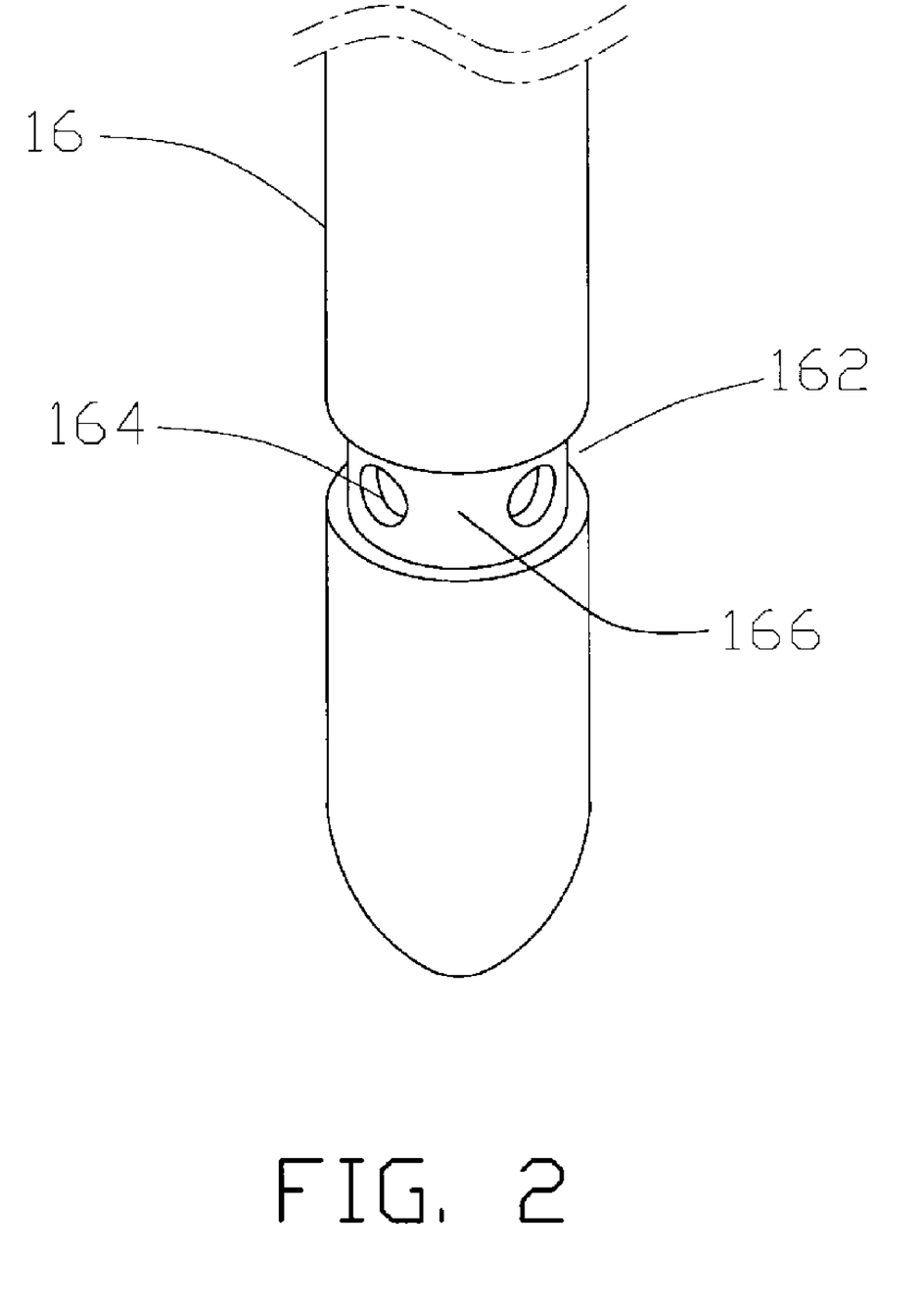
FIG. 2 is an enlarged, isometric view of a portion of a spreading tube of the spreading device of FIG. 1.

FIGS. 1-2 illustrate a spreading device 10 in accordance with a first embodiment of the present invention. The spreading device 10 includes a pressure controller 12, an injector 14 and a spreading tube 16. The injector 14 contains therein a solder paste 20 in a viscous state. The solder paste 20 is heated to become the viscous state. When the viscous solder paste 20 is cooled, it becomes solid. The solder paste 20 is made of tin alloy and is used, for example, to combine heat pipes with metal fins so that the heat pipes and the metal fins are mechanically and thermally connected. The spreading tube 16 is inserted into the injector 14 from a bottom of the injector 14. An annular recess 162 is circumferentially defined in an outer surface (not labeled) of the spreading tube 16 near a free end thereof distant from the injector 14, as shown in FIG. 2. Also, a plurality of outlet holes 164 is defined in a recessed wall portion 166 of the spreading tube 16 where the annular recess 162 is defined. The outlet holes 164 are evenly spaced from each other and are arranged in a circumferential direction of the spreading tube 16. The outlet holes 164 communicate with the annular recess 162 as well as an interior of the spreading tube 16, whereby the solder paste 20 contained in the injector 14, which is in a viscous state, is capable of being released through these outlet holes 164 and entering into the annular recess 162. The controller 12 is connected with the injector 14 via a pipe (not labeled) and is used to generate a pressure pushing a piston 142 movably accommodated in the injector 14 downwardly, whereby the solder paste 20 contained in the injector 14 is released through the outlet holes 164 smoothly and in a constant speed.

In operation, the controller 12 is controlled to generate an appropriate pressure for pushing the piston 142 to move downwardly. As a result, the solder paste 20 contained in the injector 14 is released through the outlet holes 164 of the spreading tube 16. Due to the presence of the annular recess 162, the solder paste 20 released through the outlet holes 164 firstly enters into the annular recess 162 and is accumulated therein. At this moment, the solder paste 20 flows freely to surround the recessed wall portion 166 and fill up the annular recess 162. Then, the spreading tube 16 is brought to move in a channel defined in fins of a cooling device. The fins can be referred to FIG. 9. The spreading tube 16 is brought to move from a bottom end to a top end of the channel. The movement of the spreading tube 16 causes the solder paste 20 accumulated in the annular recess 162 to be spread on an inner wall surface of the channel. As a result, the solder paste 20 is uniformly applied to an entire area of the inner wall surface. In the present spreading device 10, the annular recess 162 formed in the spreading tube 16 functions as a mechanism for applying the solder paste 20 released from the holes 164 of the tube 16 entirely and uniformly to the inner wall surface of the channel.

Figure 3:
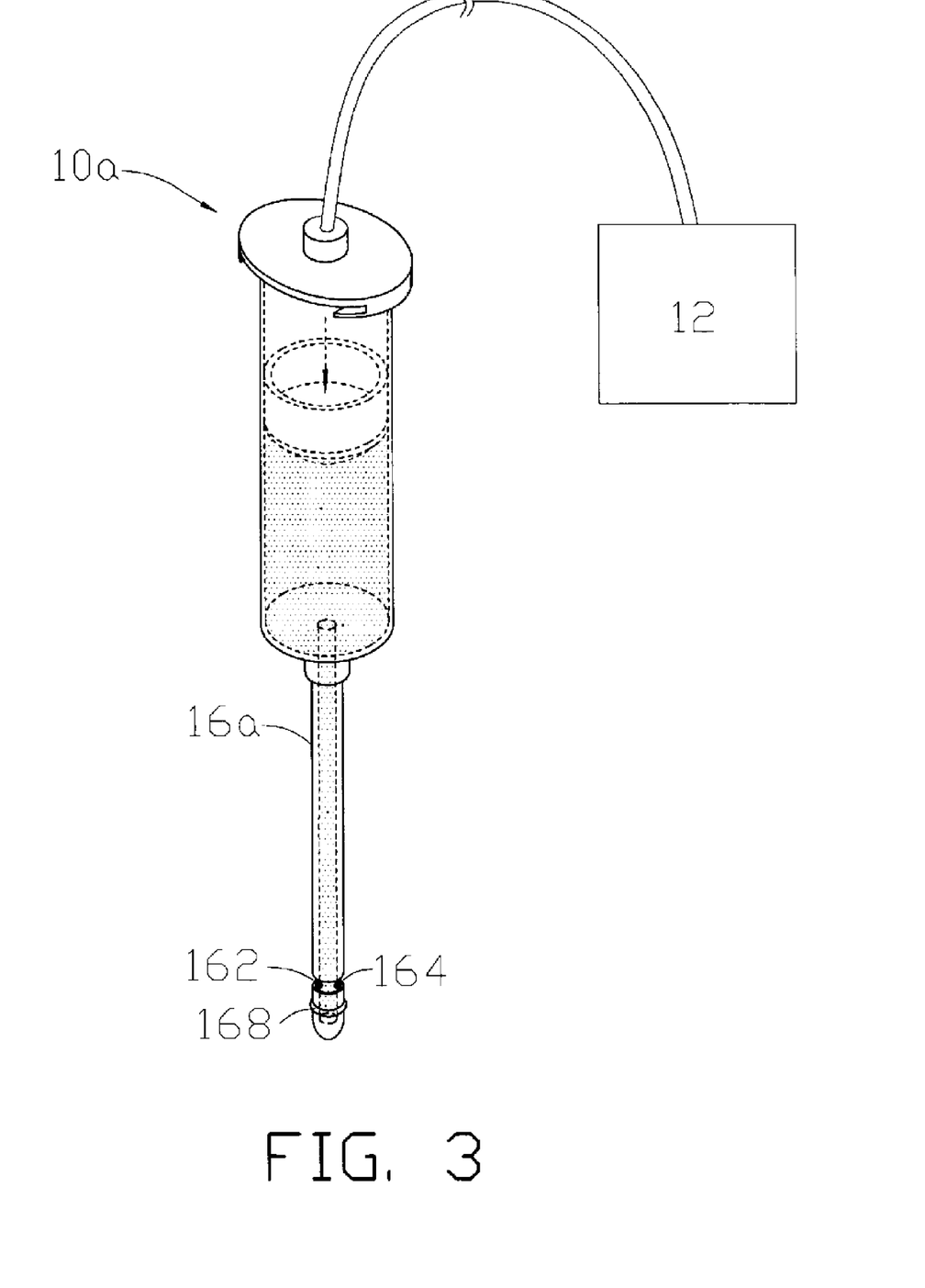
FIG. 3 is an isometric view of a spreading device in accordance with a second embodiment of the present invention.
Figure 4:
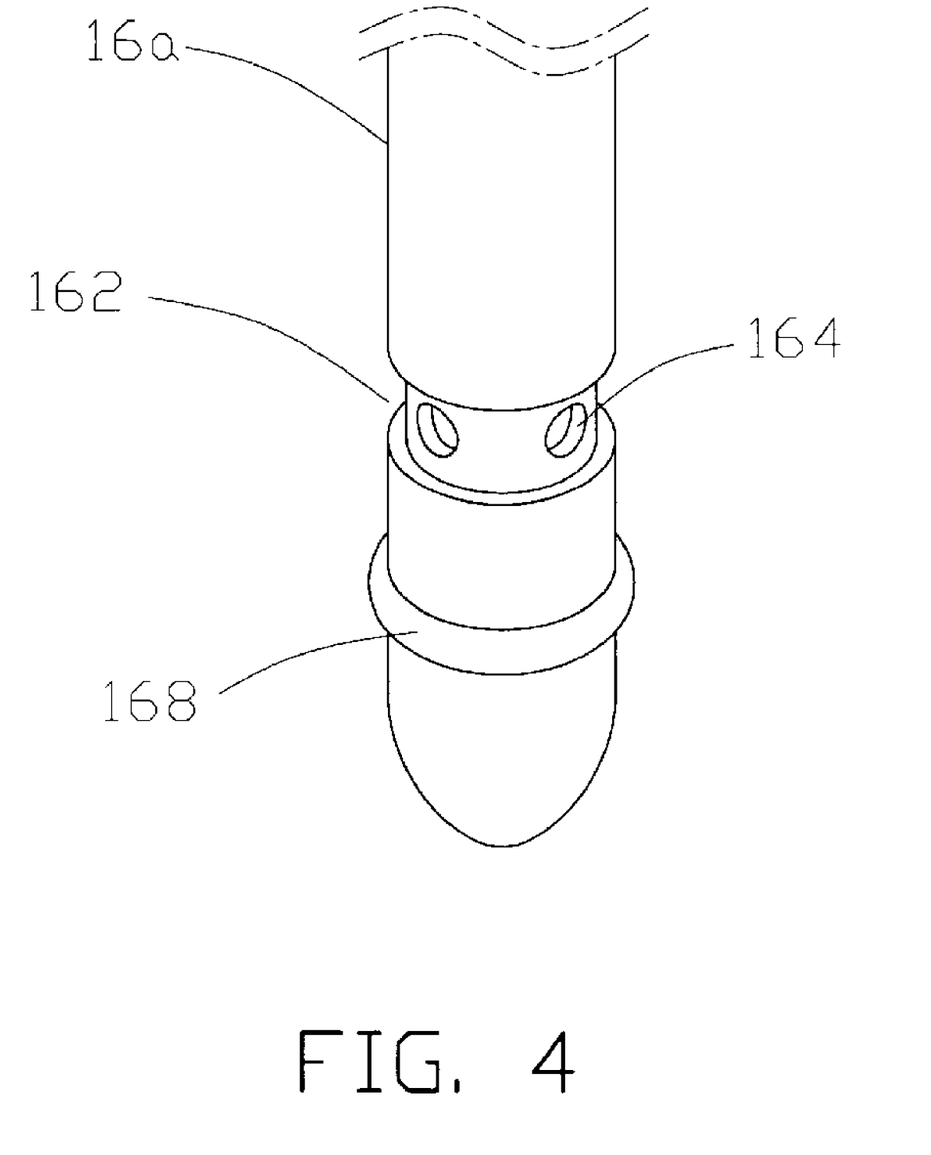
FIG. 4 is an enlarged, isometric view of a portion of a spreading tube of the spreading device of FIG. 3.

FIGS. 3-4 illustrate a spreading device 10a in accordance with a second embodiment of the present invention. In comparison with the first embodiment, the spreading tube 16a in this embodiment further includes an annular protrusion 168 formed thereon. The annular protrusion 168 extends circumferentially on the spreading tube 16a and is located between the annular recess 162 and the free end of the spreading tube 16, as shown in FIG. 4. As the solder paste 20 is spread on the inner wall surface, the annular protrusion 168 functions to press the solder paste 20 spread against the inner wall surface and scrape away an excessive amount of the solder paste 20 having spread on the inner wall surface. As a result, a layer of the solder paste 20 with a uniformly thickness is tightly applied to the inner wall surface.

Figure 5:
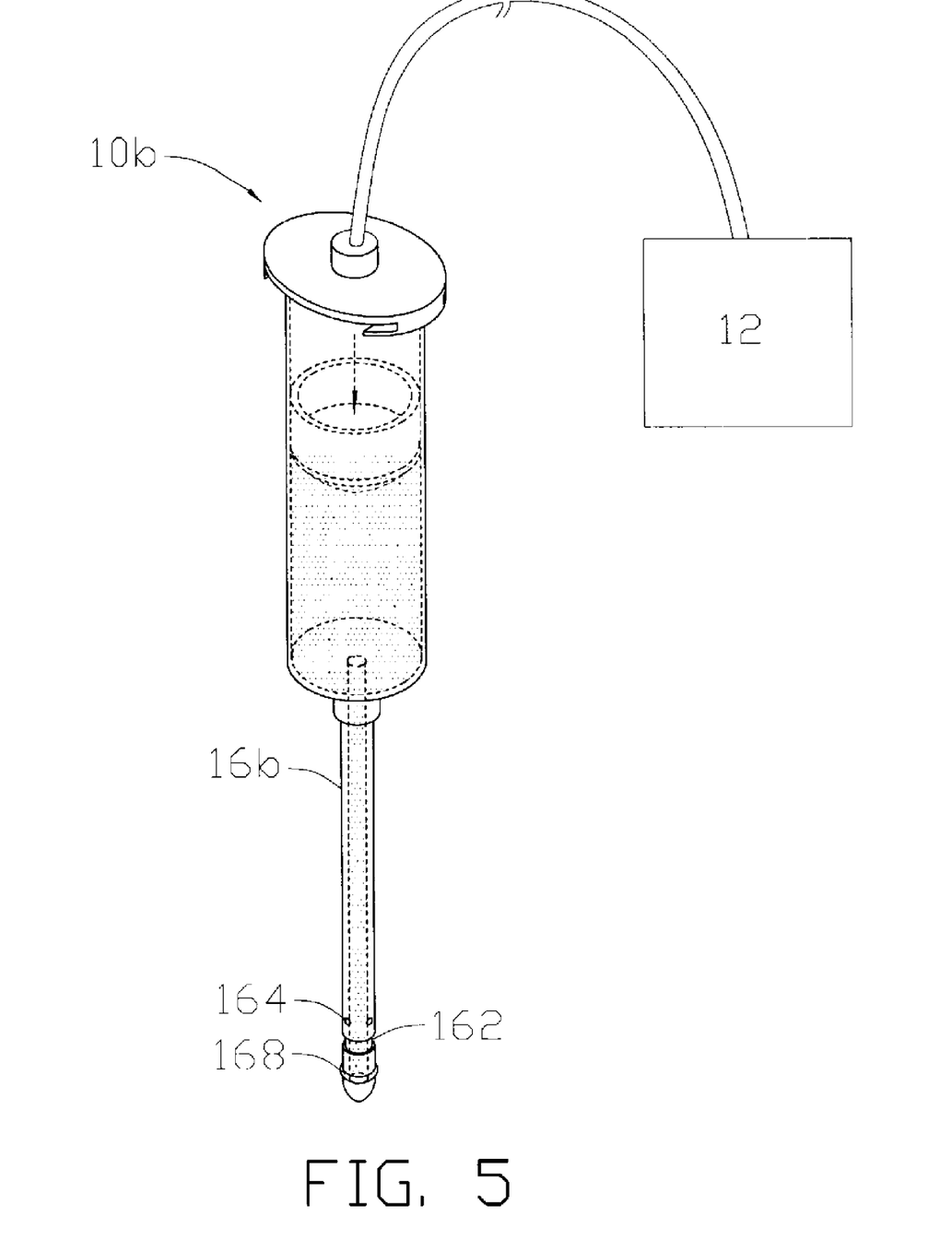
FIG. 5 is an isometric view of a spreading device in accordance with a third embodiment of the present invention.
Figure 6:
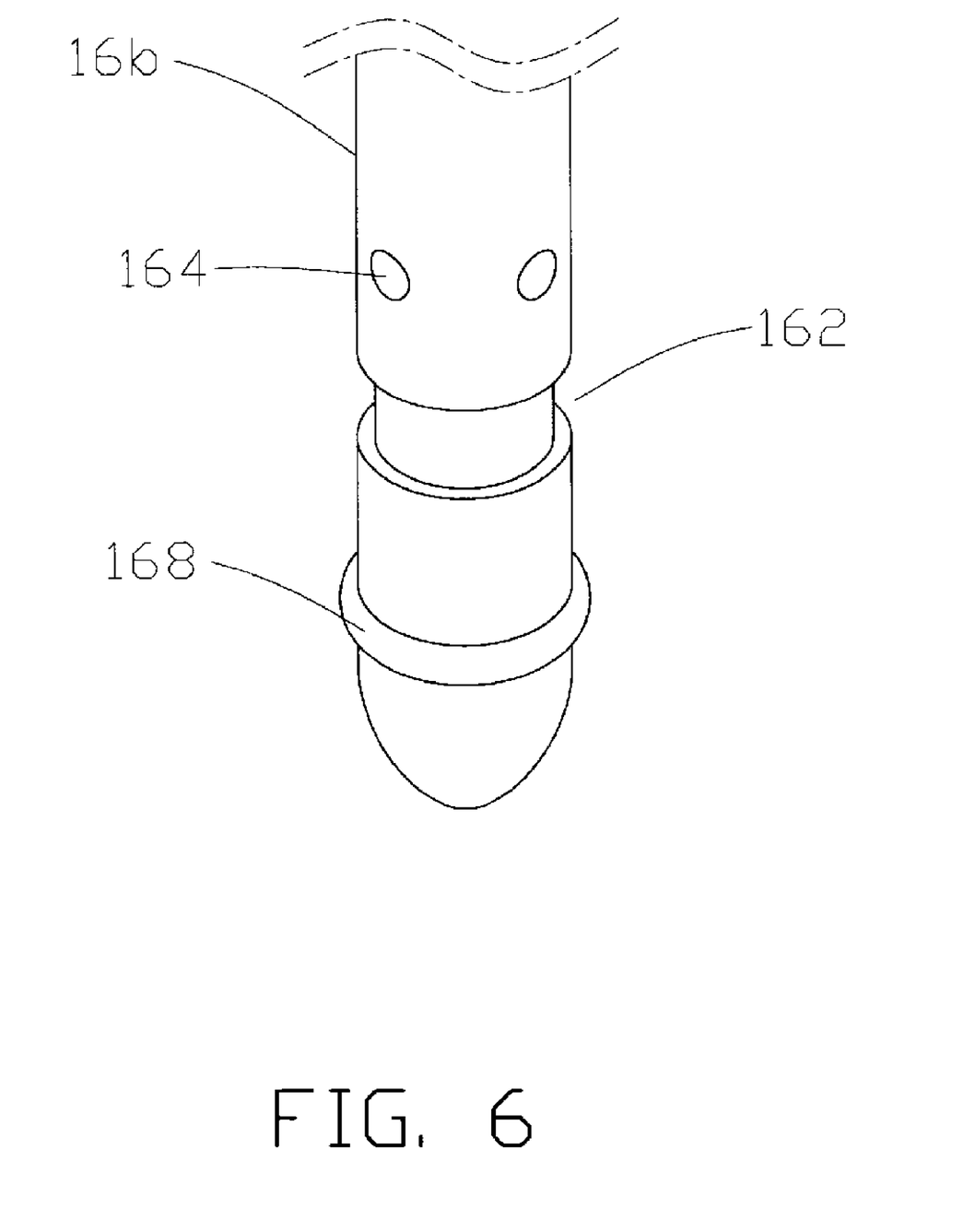
FIG. 6 is an enlarged, isometric view of a portion of a spreading tube of the spreading device of FIG. 5.

FIGS. 5-6 illustrate a spreading device 10b in accordance with a third embodiment of the present invention. In this embodiment, the annular recess 162 defined in the spreading tube 16b is located below the outlet holes 164 and the annular protrusion 168 formed on the spreading tube 16b is located below the annular recess 162, as shown in FIG. 6. In operation, a portion of the solder paste 20 released through the outlet holes 164 is directly applied to the surface while the other portion thereof flows downwardly and enters into and accumulates in the annular recess 162. As the spreading tube 16b moves, the solder paste 20 is applied to the surface evenly and uniformly by the annular recess 162 and the annular protrusion 168.

Figure 7:
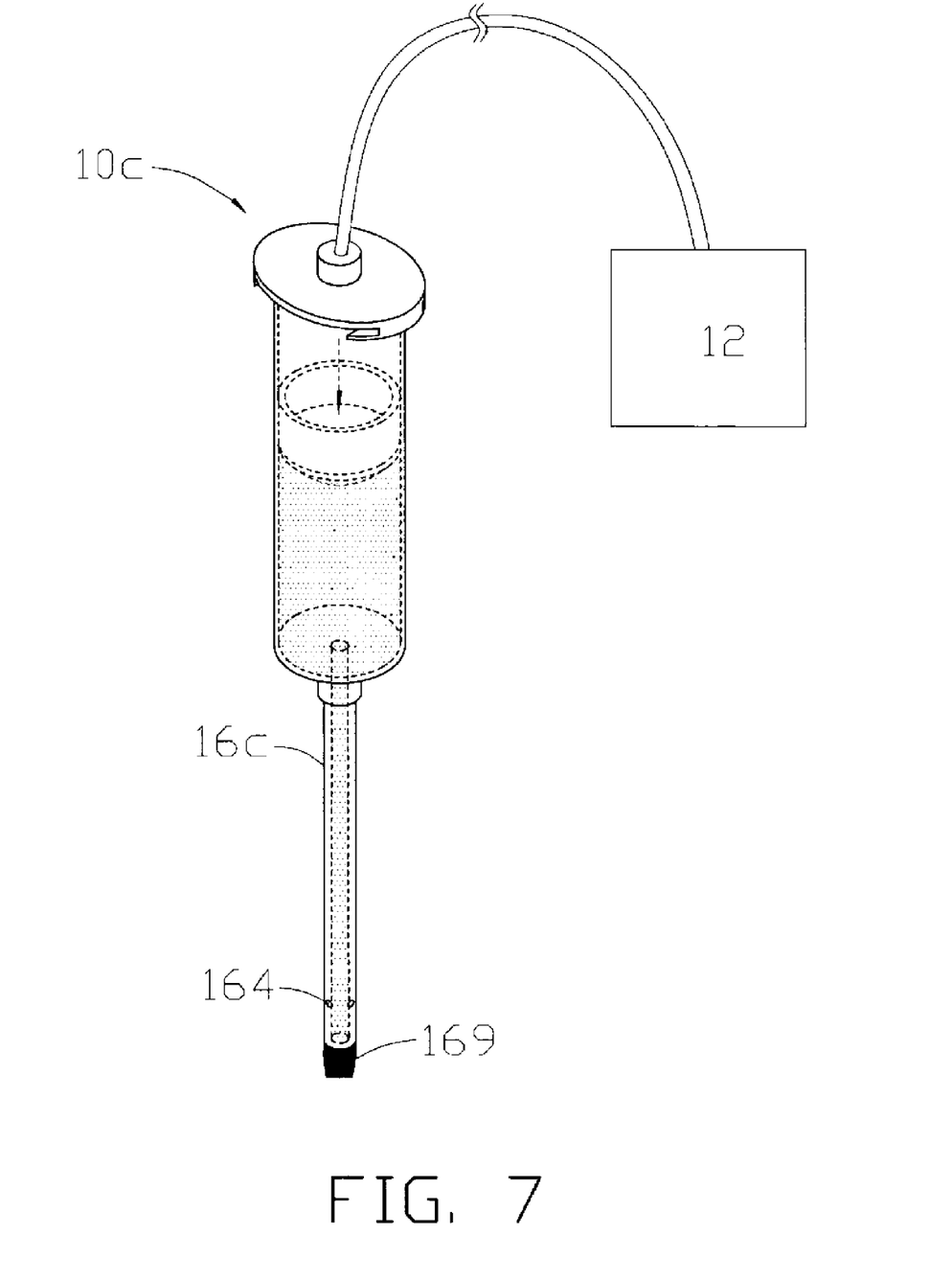
FIG. 7 is an isometric view of a spreading device in accordance with a fourth embodiment of the present invention.
Figure 8:
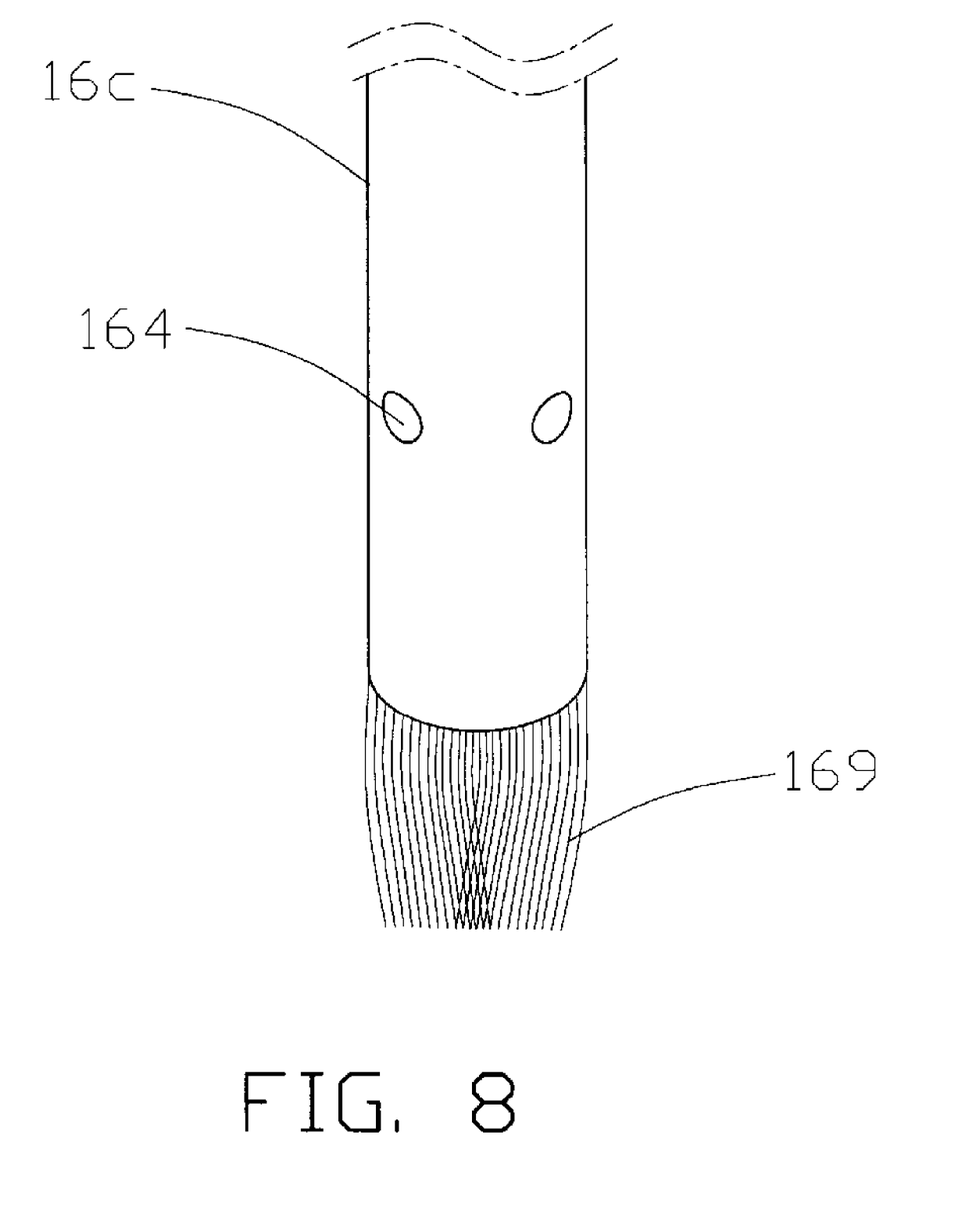
FIG. 8 is an enlarged, isometric view of a portion of a spreading tube of the spreading device of FIG. 7.

FIGS. 7-8 illustrate a spreading device 10c in accordance with a fourth embodiment of the present invention. In this embodiment, a brush 169 is connected to the free end of the spreading tube 16c and located below the outlet holes 164 defined in the spreading tube 16c, as shown in FIG. 8. In operation, as the spreading tube 16c moves along the inner wall surface of the channel of the fins, the brush 169 contacts the inner wall surface and applies the solder paste 20 released through the outlet holes 164 evenly to the surface. If the spreading tube 16c also rotates while it moves, the solder paste 20 is capable of being applied to the surface more uniformly.

In the present spreading devices 10, 10a, 10b, 10c, the annular recess 162, the annular protrusion 168, and the brush 169 are provided as effective mechanisms for distributing the solder paste 20 released from the injector 14 over the surface entirely, evenly and uniformly. Since the solder paste 20 is uniformly applied to the entire inner wall surface of the fins of the cooling device, when a heat pipe is inserted into the channel, the solder paste 20 contacts an entire area of a portion of the heat pipe in the channel. When the solder paste 20 is cooled and solidifies, the heat pipe can have a continuously thermal and mechanical connection with the fins via the solder paste 20; thus, a reliable mechanical connection between the heat pipe and the fins can be achieved. Furthermore, heat transferred by the pipe from a heat-generating electronic component to which the cooling device is thermally connected can be effectively transferred to the fins via the solder paste 20. It is well known by those skilled in the art that the spreading devices 10, 10a, 10b, 10c in accordance with the present invention can be used in spreading not only the solder paste 20, but also other viscous thermal medium material, for example, thermal grease.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A spreading device for spreading viscous thermal medium material to an inner wall surface of a channel defined through a cooling device for electronic component, comprising:

an injector having the viscous thermal medium material and a piston therein;

a pressure control for exerting a controlled pressure to the viscous thermal medium material through the piston; and a spreading tube extending from the injector and fludically communicating with the injector, having a plurality of holes therein and a recess, the viscous thermal medium material being able to flow out of the spreading tube through the holes, the holes being located near a free end of the spreading tube distant from the injector, the viscous thermal medium material filling the recess before being spread on the inner wall surface;

wherein the holes are located in the recess; and wherein the spreading tube further comprises a protrusion thereon and the protrusion is located between the recess and the free end of the spreading tube.

* * * * *